United States Patent
Natvig

(10) Patent No.: US 11,055,233 B2
(45) Date of Patent: *Jul. 6, 2021

(54) PREDICTIVE MEMORY MANAGEMENT

(71) Applicant: Medallia, Inc., San Mateo, CA (US)

(72) Inventor: Thorvald Natvig, Palo Alto, CA (US)

(73) Assignee: Medallia, Inc., San Francisco, CA (US)

( * ) Notice: Subject to any disclaimer, the term of this patent is extended or adjusted under 35 U.S.C. 154(b) by 239 days.

This patent is subject to a terminal disclaimer.

(21) Appl. No.: 16/184,558

(22) Filed: Nov. 8, 2018

(65) Prior Publication Data

US 2019/0138456 A1 May 9, 2019

Related U.S. Application Data

(63) Continuation of application No. 14/924,594, filed on Oct. 27, 2015, now Pat. No. 10,152,429.

(51) Int. Cl.
*G06F 12/109* (2016.01)
*G06F 16/2453* (2019.01)
*G06F 12/12* (2016.01)

(52) U.S. Cl.
CPC ...... *G06F 12/109* (2013.01); *G06F 16/24549* (2019.01); *G06F 12/12* (2013.01)

(58) Field of Classification Search
None
See application file for complete search history.

(56) References Cited

U.S. PATENT DOCUMENTS

| 6,112,210 | A | 8/2000 | Nori | |
| 6,247,094 | B1* | 6/2001 | Kumar | G06F 12/0862 |
| | | | | 711/118 |
| 6,453,404 | B1* | 9/2002 | Bereznyi | G06F 12/023 |
| | | | | 711/119 |
| 9,092,470 | B2 | 7/2015 | Schreck | |
| 2002/0069317 | A1* | 6/2002 | Chow | G06F 3/067 |
| | | | | 711/104 |
| 2003/0196157 | A1 | 10/2003 | Kern | |
| 2007/0118548 | A1 | 5/2007 | Carapella | |
| 2007/0143547 | A1* | 6/2007 | Farmer | G06F 12/0862 |
| | | | | 711/137 |
| 2009/0197658 | A1* | 8/2009 | Polchin | A63F 13/06 |
| | | | | 463/9 |
| 2009/0199170 | A1* | 8/2009 | Arimilli | G06F 9/383 |
| | | | | 717/162 |
| 2009/0254594 | A1* | 10/2009 | Burchall | G06F 16/2453 |
| 2010/0299496 | A1* | 11/2010 | Arimilli | G06F 9/4843 |
| | | | | 712/32 |
| 2011/0077998 | A1 | 3/2011 | Yan | |
| 2011/0298637 | A1* | 12/2011 | Posner | H04H 20/55 |
| | | | | 340/905 |

(Continued)

*Primary Examiner* — Wilson Lee

(57) ABSTRACT

A query for data stored in a database that includes a set of segments is received at a computer system. The set of segments are divided into a plurality of columns and at least one column of the plurality of columns includes one or more fields. The system analyzes the query to determine fields required to be retrieved from the database. The system determines whether a required field of the query is located in a main memory of the computer system. The system creates an input/output request for a column containing the required field for a plurality of segments of the set of segments prior to executing the query.

20 Claims, 9 Drawing Sheets

(56) References Cited

U.S. PATENT DOCUMENTS

| | | |
|---|---|---|
| 2014/0059085 A1 | 2/2014 | Schreck |
| 2014/0201129 A1 | 7/2014 | Gupta |
| 2015/0186255 A1 | 7/2015 | Petculescu |
| 2015/0213631 A1 | 7/2015 | Vander Broek |
| 2015/0331898 A1* | 11/2015 | Ou ................... G06F 16/2365 707/703 |
| 2017/0039280 A1 | 2/2017 | Kapse |
| 2017/0091117 A1* | 3/2017 | Cain, III ............ G06F 12/121 |
| 2017/0116232 A1 | 4/2017 | Marwah |

* cited by examiner

112

| Seg. 1 Col. 1 | Seg. 1 Col. 2 | Seg. 1 Col. 3 | Seg. 1 Col. 4 | Seg. 1 Col. 5 | Seg. 1 Col. 6 |
|---|---|---|---|---|---|
| Seg. 1 Col. 7 | Seg 1 Col. 8 | Seg. 1 Col. 9 | Seg. 2 Col. 1 | Seg. 2 Col. 2 | Seg. 2 Col. 3 |
| Seg. 2 Col. 4 | Seg. 2 Col. 5 | Seg. 2 Col. 6 | Seg. 2 Col. 7 | Seg. 2 Col. 8 | Seg. 2 Col. 9 |
| ○ ○ ○ | Seg. N Col. 1 | Seg. N Col. 2 | Seg. N Col. 3 | Seg. N Col. 4 | Seg. N Col. 5 |
| Seg. N Col. 6 | Seg. N Col. 7 | Seg. N Col. 8 | Seg. N Col. 9 | | |

| Seg. 1 Col. 1 | Seg. 1 Col. 2 | Seg. 1 Col. 3 | Seg. 1 Col. 4 | Seg. 1 Col. 5 | Seg. 1 Col. 6 |
|---|---|---|---|---|---|
| Seg. 1 Col. 7 | Seg. 1 Col. 8 | Seg. 1 Col. 9 | Seg. 2 Col. 1 | Seg. 2 Col. 2 | Seg. 2 Col. 3 |
| Seg. 2 Col. 4 | Seg. 2 Col. 5 | Seg. 2 Col. 6 | Seg. 2 Col. 7 | Seg. 2 Col. 8 | Seg. 2 Col. 9 |
| ○ ○ ○ | Seg. N Col. 1 | Seg. N Col. 2 | Seg. N Col. 3 | Seg. N Col. 4 | Seg. N Col. 5 |
| Seg. N Col. 6 | Seg. N Col. 7 | Seg. N Col. 8 | Seg. N Col. 9 | | |

| Seg. 1 Col. 1 | Seg. 2 Col. 1 | ○ ○ ○ | Seg. N Col. 1 | Seg. 1 Col. 2 | Seg. 2 Col. 2 |
| --- | --- | --- | --- | --- | --- |
| ○ ○ ○ | Seg. N Col. 2 | Seg. 1 Col. 3 | Seg. 2 Col. 3 | ○ ○ ○ | Seg. N Col. 3 |
| ○ ○ ○ | Seg. 1 Col. 7 | Seg. 2 Col. 7 | ○ ○ ○ | Seg. N Col. 7 | Seg. 1 Col. 8 |
| Seg. 2 Col. 8 | ○ ○ ○ | Seg. N Col. 8 | Seg. 1 Col. 9 | Seg. 2 Col. 9 | ○ ○ ○ |
| Seg. 2 Col. 9 | | | | | 510 |

FIG. 5C

PREDICTIVE MEMORY MANAGEMENT

CROSS REFERENCE TO OTHER APPLICATIONS

This application is a continuation of co-pending U.S. patent application Ser. No. 14/924,594, entitled PREDICTIVE MEMORY MANAGEMENT filed Oct. 27, 2015 which is incorporated herein by reference for all purposes.

BACKGROUND OF THE INVENTION

An in-memory database is a database whose data is stored in main memory to facilitate faster response times. Due to the size of databases, it may be impractical to store all of the data in the main memory. Disk storage systems or solid state drives may be used to store data for large databases. Although they are capable of storing large amounts of data, the time required to retrieve data from such storage increases the amount of time required to execute a search query. It would be useful to create a system that approaches the performance of an in-memory database and decreases the amount of time required to execute a process, but allows large amounts of data to be stored in long term storage.

BRIEF DESCRIPTION OF THE DRAWINGS

Various embodiments of the invention are disclosed in the following detailed description and the accompanying drawings.

FIGS. 5A-5C are diagrams illustrating embodiments of a layout of high speed storage.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Predictive memory management is disclosed. For a database that includes segments having columns and fields, a search query may reference fields that are already stored in main memory and fields that are not already stored in main memory. Using the techniques disclosed herein, the system analyzes the search query before the search query is executed and preloads columns containing referenced fields for multiple segments into main memory to reduce the amount of time required to execute the search query. The query can execute in parallel while columns are being preloaded. In fact, the query can operate immediately on segments having fields already in main memory. This technique significantly reduces the amount of time required to perform and execute a search query.

Figure 1:
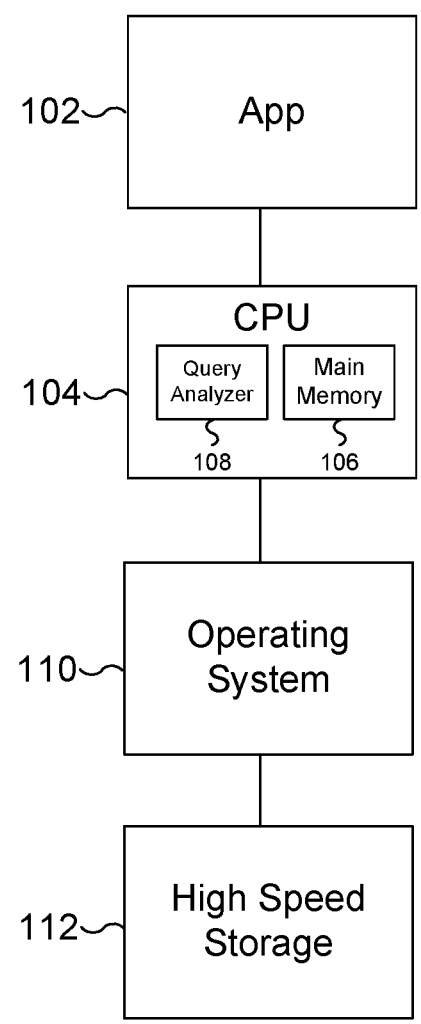
FIG. 1 is a diagram showing a system for retrieving data.

FIG. 1 is a diagram showing a system for predictive memory management. In the example shown, predictive memory management system 100 includes an application 102, a computer processing unit (CPU) 104, an operating system (OS) 110, and high speed storage (HSS) 112. The CPU 104 implements a query analyzer 108 and main memory 106. In various embodiments, the query analyzer 108 may be part of the CPU 104 or a separate piece of software, hardware, and/or combination of software and hardware that analyzes the query received by application 102. Main memory 106 is memory that is implemented in the CPU or very close to the CPU. HSS 112 may refer to a solid state drive, a hard disk drive, or any other high speed long term storage.

The application 102 receives a search query from a user and provides the search query to the CPU 104. The query may include one or more fields. The CPU 104 executes the query using data that is stored in main memory 106. If the data is not stored in main memory 106 then the CPU 104 must retrieve the columns corresponding to the fields from HSS 112. Retrieving data from HSS 112 is relatively slow compared to retrieving data from main memory 106. To decrease the amount of time required to execute a query and to improve the performance of the CPU 104, the query analyzer 108 analyzes the query before it is executed on at least some of the segments in the database and the system 100 begins to load the columns containing the fields into main memory 106.

The query analyzer 108 analyzes the query to determine whether any of the data corresponding to the fields is stored in main memory 106. A query may include a search where all of the fields are already stored in main memory 106. Other queries may include a search where some of the fields are stored in main memory 106 and some of the fields are stored in HSS 112. Other queries may include a search where all of the fields are stored in HSS 112. The data that is already stored in main memory 106 generally corresponds to fields that are frequently queried by application 102. The data that is not already stored in main memory 106, but stored in HSS 112 generally corresponds to fields that are not frequently queried by application 102. HSS 112 stores a copy of all fields, regardless of whether a field is stored in main memory 106.

The OS 110 is a computer program that manages the I/O (input/output) requests. The OS 110 requests that the data stored in a column associated with a requested field be retrieved from HSS 112. The CPU 104, OS 110, and HSS 112 work together to load the columns corresponding to the requested fields into main memory 106.

Figure 2A:
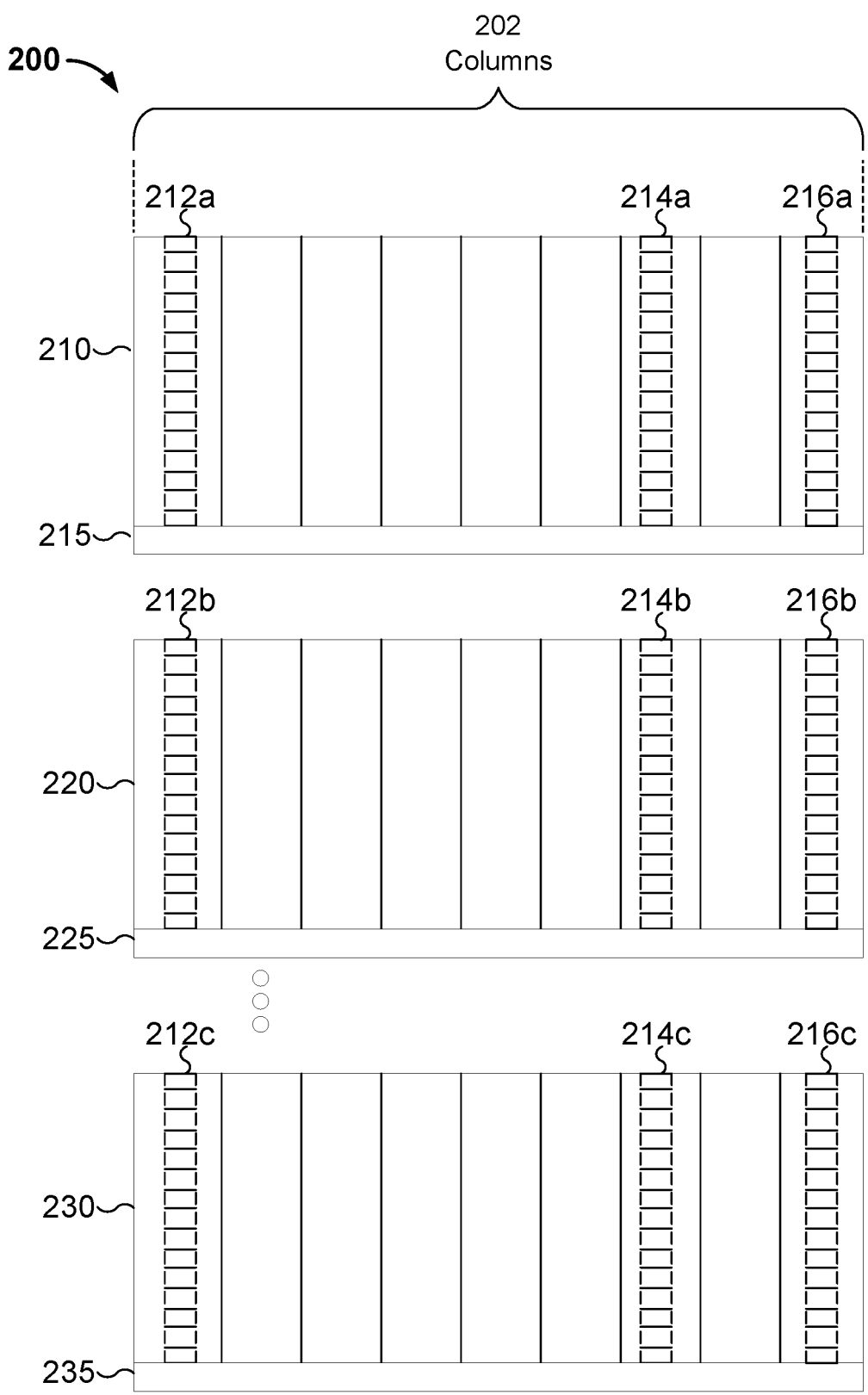
FIGS. 2A and 2B are diagrams illustrating a databases divided into segments.

FIG. 2A is a diagram illustrating a database divided into segments. In the example shown, a memory database 200 includes segments 210, 220, and 230. Segment 210 corresponds to a first memory segment. Segment 220 corresponds to a second memory segment. Segment 230 corresponds to the Nth memory segment. Each segment includes one or more rows.

Each of the segments includes one or more columns 202. In FIG. 2A, the segments have nine columns. The memory segments may have more than nine columns or the memory segments may have less than nine columns. In the embodiment shown, the width of each column is 32 bits. The width of each column can also be 64 bits or other appropriate size. The width of some of the columns may vary, for example, with some columns being 32 bits and others being 64 bits.

Each of the columns 202 may store one or more fields or a column may be empty. In the example shown, field 212 is already stored in main memory 106. Fields 214 and 216 are not already stored in main memory 106. The width of the fields may be different for each field. For example, the width may be four bits, eight bits or other value.

The fields are stored in the set of segments. For example, field 212, represented by 212a, 212b, 212c, is stored from segment 210 to segment 230. Field 214, represented by 214a, 214b, 214c, is stored from segment 210 to segment 230. Field 216, represented by 216a, 216b, 216c, is stored from segment 210 to segment 230.

The data stored in each field in each segment spans a range of values. A segment may store the range of values for each field included in that particular segment. For example, the min and max values for each field may be stored in two additional rows of the segment. The rows may be at the top or bottom of each segment. The first row corresponds to a minimum value that a particular field has within a particular segment. The second row corresponds to a maximum value that a particular field has within a particular segment. In the example shown, segment 210 includes an element 215 that corresponds to the rows that specify the ranges of values for each of the fields included in segment 210. Segment 220 includes an element 225 that corresponds to the rows that specify the range of values for each of the fields included in segment 220. Segment 230 includes an element 235 that corresponds to the rows that specify the range of values for each of the fields included in segment 230. In other embodiments, the range of values for each field within each segment is stored in a separate data structure.

Figure 2B:
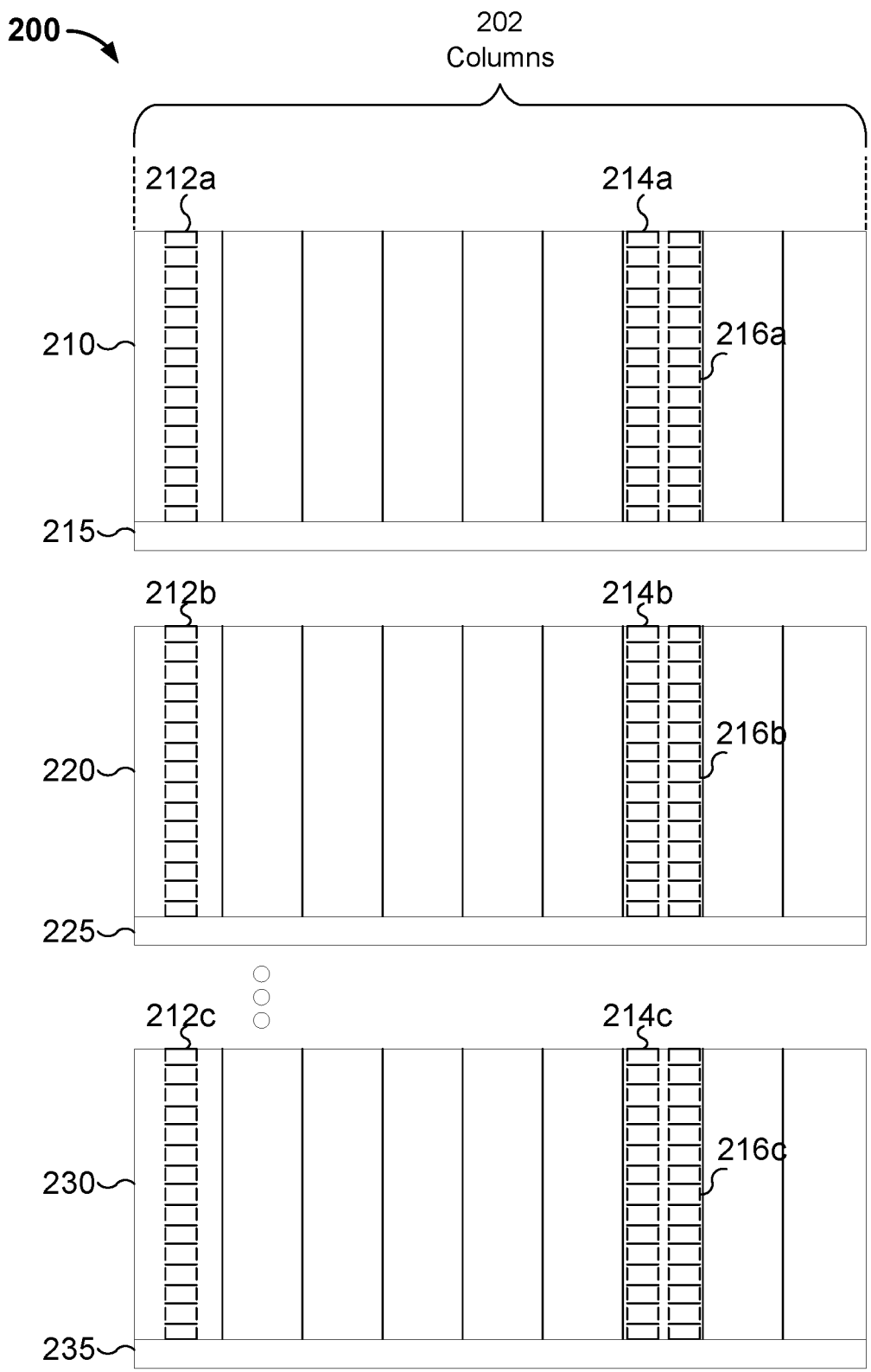

FIG. 2B is a diagram illustrating another database divided into segments. FIG. 2B is similar to FIG. 2A except that one of the columns 202 is depicted as having two fields in a single column. Although FIG. 2B depicts one of the columns 202 storing two fields, it is possible to store more than two fields within a single column. Field 214, represented by 214a, 214b, 214c, is stored from memory segment 210 to the Nth segment 230. Field 216, represented by 216a, 216b, 216c, is stored from memory segment 210 to the Nth segment 230. In the example shown, field 214 and field 216 represent fields that are not frequently queried by application 102. Query analyzer 108 determines over time that even though fields 214, 216 are not frequently searched fields, when a user performs a search query that includes field 214, the search query frequently also includes field 216. When this occurs, field 214 and 216 are considered to be correlated fields. Storing correlated fields 214 and 216, as shown in FIG. 2B, in the same column is desirable. This increases the efficiency of preloading the fields into main memory 106 before a search query is executed because instead of requiring two separate columns to be loaded into main memory 106, the process requires only a single column to be loaded into main memory 106.

Figure 3:
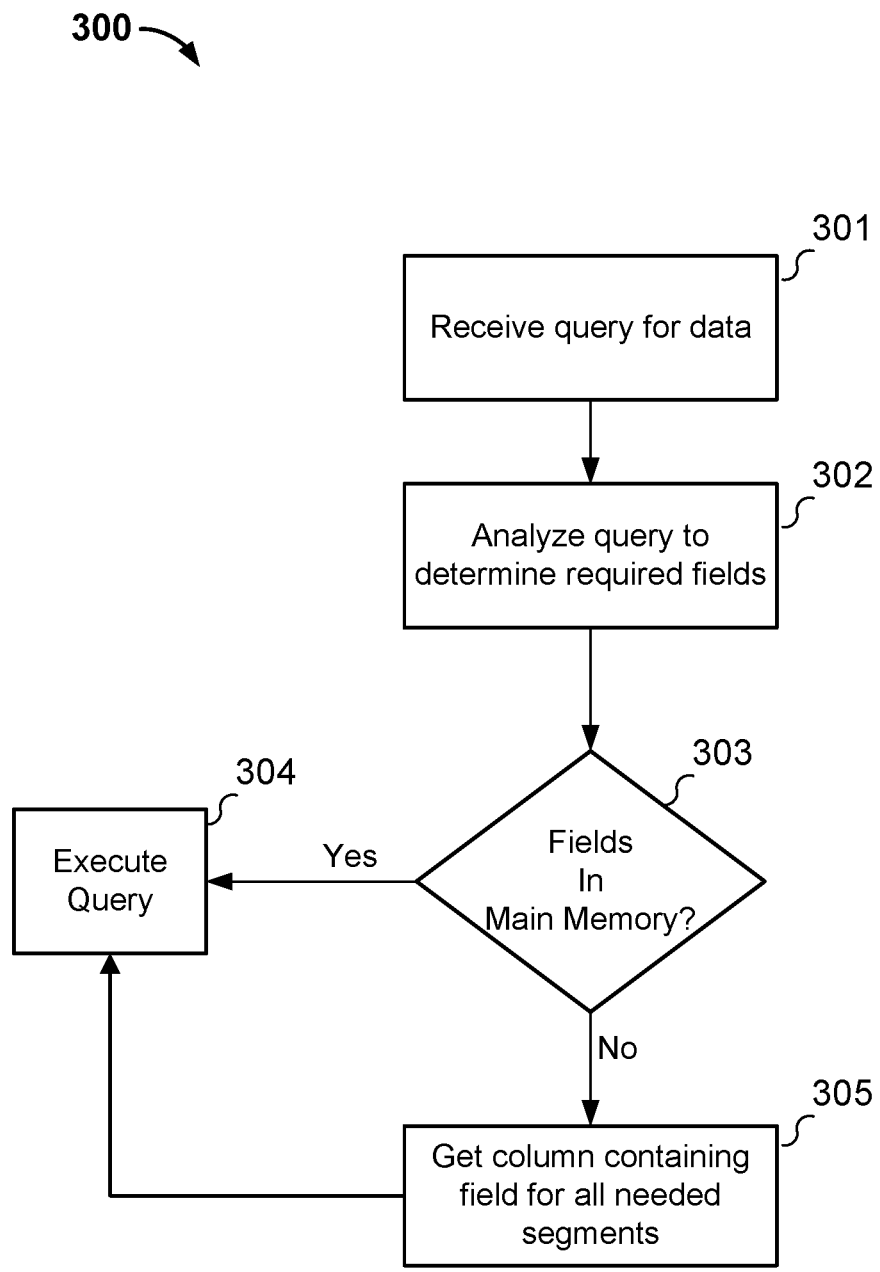
FIG. 3 is a flowchart illustrating a process for retrieving information.

FIG. 3 is a flow chart depicting the process of executing a search query.

At step 301, a search query is received by application 102. The search query may reference one or more fields. The search query may also include one or more ranges corresponding to the one or more fields. The fields may be stored in main memory 106 and HSS 112. Fields stored in main memory 106 generally are fields that are frequently queried by application 102.

At step 302, query analyzer 108 analyzes the fields within the search query. The query analyzer 108 determines the fields and if any of the fields in the search query have a corresponding range.

At step 303, the query analyzer 108 determines whether the fields are already stored in main memory 106. If all of the fields are already stored in main memory 106, then the process proceeds to step 304 where the search query is executed by the CPU 104. If at least one of the fields is not already stored in main memory 106, then the process proceeds to step 305.

At step 305, a list is created. The list is comprised of one or more requests that include the columns storing the field for each segment that needs to be loaded into main memory 106. The list is handled by the OS 110. The OS 110 converts all of the requests on the list into storage requests. According to one embodiment, when an initial request is added to the list, the list is provided to the OS 110 and the system begins to retrieve the columns from HSS 112 and loads columns into main memory 106 for each segment. The loaded columns overwrite data that corresponds to least frequently queried fields previously stored in the main memory. Multiple requests may be subsequently added to the list after the initial request. The OS 110 merges the multiple requests together. As subsequent requests are added to the list, the system continues to load data into main memory 106. In some embodiments, the list is not provided to the OS 110 until the list has a batch or complete list of requests. When the batch or complete list of requests is provided to the OS 110, the system begins to retrieve the columns for each segment from HSS 112 and loads them into main memory 106.

All of the memory segments containing the column storing a required field may be added to the list. Alternatively, some of the memory segments may be left off the list if it is determined that a segment does not include values for a field that fall within a range specified by a query.

The system proceeds to step 304 and executes the query after at least a portion of the data from the requested columns is loaded into main memory 106. Alternatively, the system begins to execute the query immediately on any segments having columns already in main memory. Alternatively, the system proceeds to step 304 and executes the query after all the data from the requested columns is loaded into main memory 106.

Figure 4:
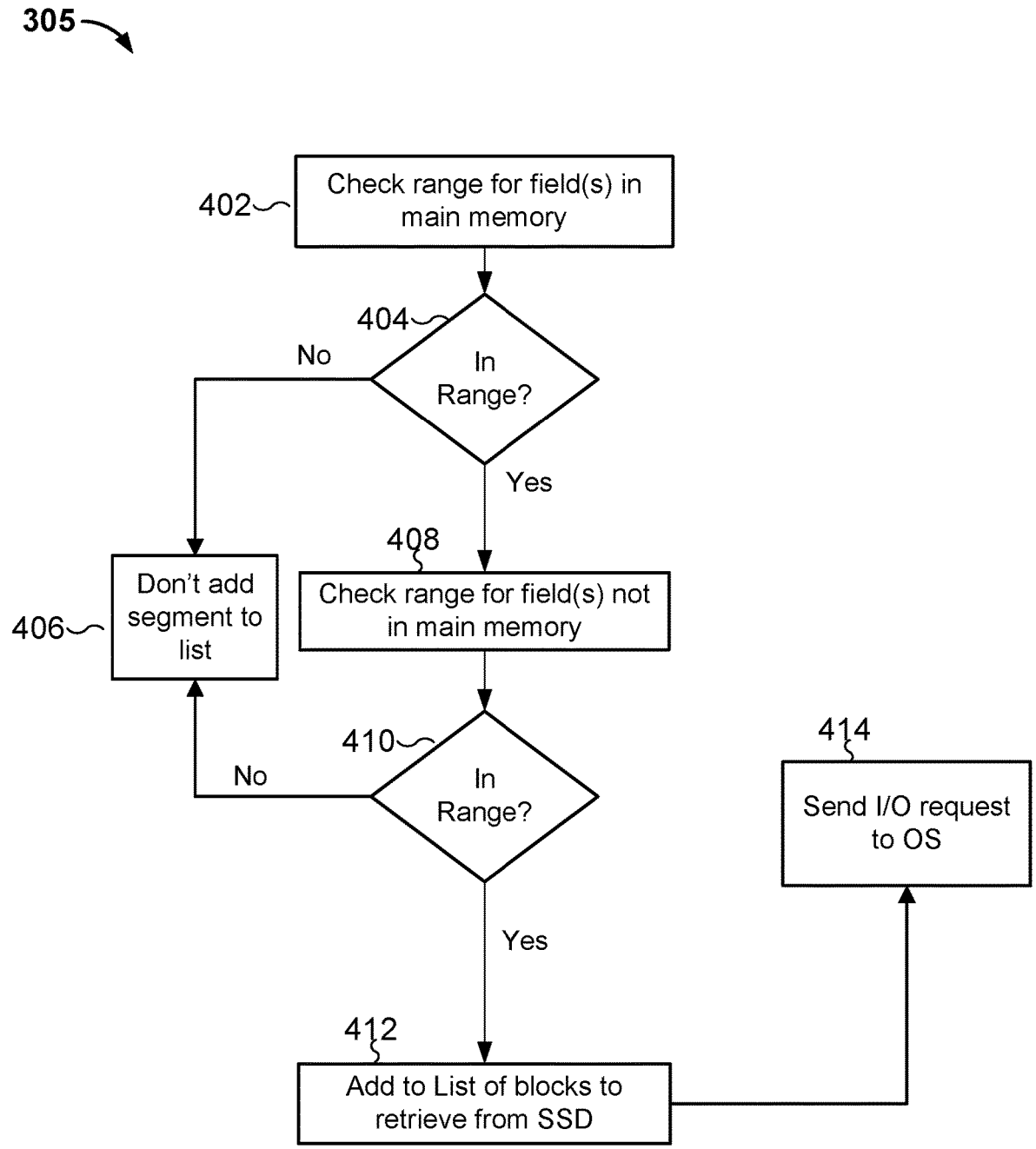
FIG. 4 is a flowchart illustrating a process for retrieving information.

FIG. 4 further describes step 305 in an embodiment where a search query includes one or more fields and one or more ranges associated with the fields. The query analyzer 108 first checks whether the range of values stored in a segment for a required field can satisfy the range of values specified in the query before the list of requests is created. In the example shown, the query analyzer 108 first checks the ranges of fields already stored in main memory and then checks the ranges of fields not already stored in main memory in order to determine whether to load a given segment. The range information for each field may be stored in rows associated with each segment or the range may be stored in a separate data structure. The order of the range check may be reversed such that the query analyzer 108 first checks the ranges of fields not already stored in main memory and then checks the ranges of fields already stored in main memory in order to determine whether to load a given segment. In some embodiments, the query analyzer does not distinguish between fields that are in main memory or are not in main memory when checking ranges.

At step 402, the query analyzer 108 determines the range of a first field specified by a query where the first field corresponds to data already stored in main memory 106.

At step 404, the query analyzer 108 determines for each memory segment of the set of segments whether the range of values stored in a memory segment for the first field can satisfy the range of values specified in the query for the first field. If the range of values of the field within a memory segment is outside of the range of values specified by the query for the first field, then the process proceeds to step 406 and that particular memory segment is not added to the list of requested memory segments. If the range of values of the field within a memory segment is within the range of values for the first field specified by the query, then the process proceeds to step 408.

At step 408, the query analyzer 108 determines the range of a second field specified by a query where the second field corresponds to data not already stored in main memory 106.

At step 410, the query analyzer 108 determines for each memory segment of the remaining memory segments whether the range of values stored in a remaining memory segment for the second field can satisfy the range of values specified in the query for the second field. If the range of values of the second field within a remaining memory segment is outside of the range of values specified by the query for the second field, then the process proceeds to step 406 and that particular memory segment is not added to the list of requested memory segments. If the range of values of the second field within a remaining memory segment is within the range of values for the second field specified by the query, then the process proceeds to step 412.

In some queries, the search query may include the first field, the second field, and either a range of values for the first field or a range of values for the second field. In this instance, either steps 402/404 or steps 408/410 may be skipped depending on the range of values.

At step 412, a memory segment that satisfies steps 404 and 410 along with the corresponding column containing the field not already stored in main memory 106 is added to the list of requests to be handled by the OS 110.

At step 414, the I/O requests for the segments and corresponding columns is sent to the OS 110. The list of storage requests corresponds to the memory segment(s) that satisfy the range of values specified in the query. According to one embodiment, when an initial request is added to the list, the system begins to retrieve the data from the corresponding columns and corresponding memory segments from HSS 112 and loads the data from corresponding columns and corresponding memory segments into main memory 106. Multiple requests may be subsequently added to the list after the initial request. The OS 110 merges the multiple requests together. According to another embodiment, the list is not provided to the OS 110 until the list has a batch or complete list of segments and corresponding columns. When the batch or complete list is provided to the OS 110, the system begins to retrieve the data from corresponding columns and corresponding memory segments from HSS 112 and loads the corresponding columns and corresponding memory segments into main memory 106.

FIG. 5A depicts a layout showing how segments and columns are organized in HSS 112 according to some embodiments. In the example shown, HSS 112 sequentially stores the data values by memory segments. For explanation purposes, FIG. 5A corresponds to the memory segments depicted in FIG. 2A. HSS 112 first stores the columns of the first memory segment 210, then the columns of the second memory segment 220, then the columns of the memory segments between the second memory segment 220 and the Nth memory segment 220, and finally the columns of the Nth memory segment 230. In the example shown, "Seg. 1, Col. 1" corresponds to field 212a, "Seg. 1, Col. 7" corresponds to field 214a, and "Seg. 1, Col. 9" corresponds to field 216a. The remaining disk space 510 of HSS 112 represents the portion of HSS 112 that is not currently used to store the data associated with the one or more fields.

FIG. 5B depicts a layout showing how segments and columns are organized in HSS 112 according to other embodiments. For explanation purposes, FIG. 5B corresponds to the memory segments depicted in FIG. 2B. The columns are stored in a similar manner on HSS 112 as FIG. 5A, except that FIG. 5B depicts columns storing correlated fields together. In the example shown, "Seg. 1, Col. 7" corresponds to correlated fields 214a, 216a of FIG. 2B.

FIG. 5C depicts a layout showing how segments and columns are organized in HSS 112 in an embodiment where the memory segments structure for all the memory segments is the same. As seen in FIG. 5C, the plurality of segments are stored in HSS 112 in an order based on the columns. In the example shown, all of the memory segments from segment 210 to segment 230 for column 1 are stored, then all of the memory segments from segment 210 to segment 230 for column 2 are stored, and so forth. Co-locating the memory segments by column may reduce the number of requests required to retrieve the required fields. For example, all the segments of column 7 may be loaded into main memory with one request. In contrast, if HSS 112 had a layout as depicted in FIG. 5A, loading all of the segments of column 7 would require multiple requests.

Figure 6:
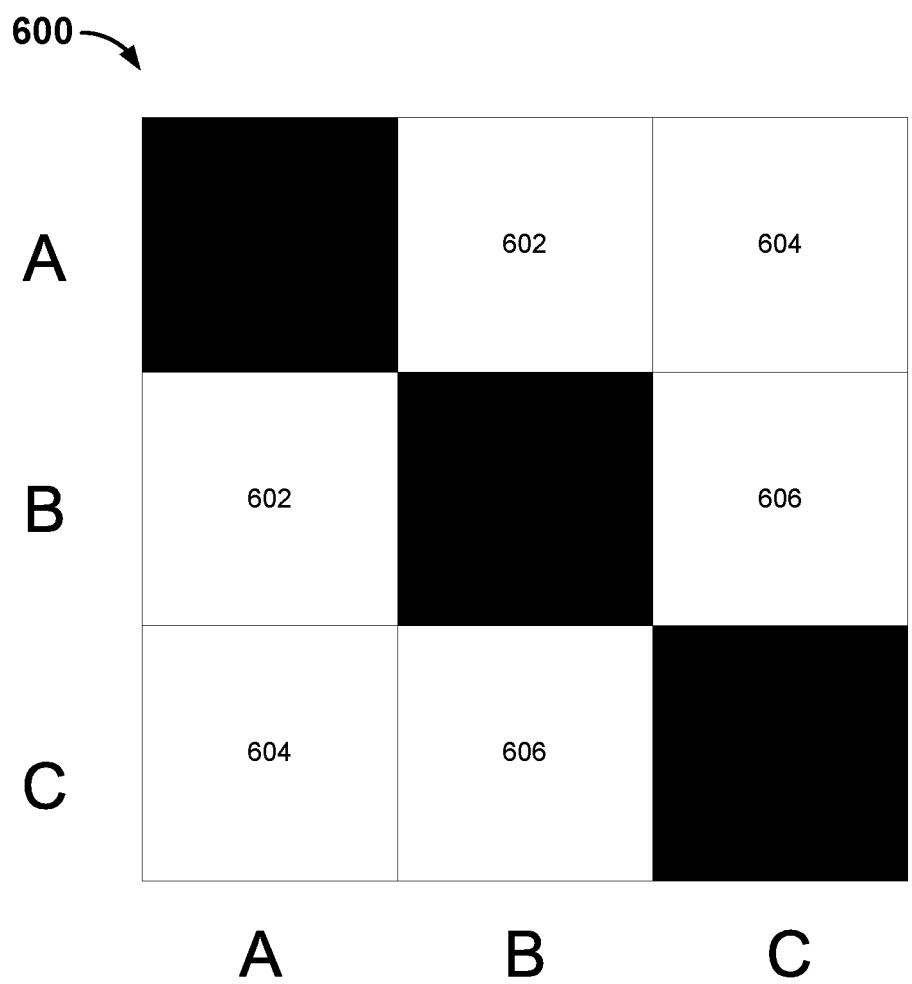
FIG. 6 is a diagram illustrating a correlation matrix.

FIG. 6 depicts a correlation matrix. The correlation matrix is used to determine whether a field is correlated with another field. Box 602 represents a frequency in which a search query for field A included field B and vice versa. A counter is incremented each time a search query is performed that includes both fields A and B. Box 604 represents a frequency in which a search query for field A included field C and vice versa. A counter is incremented each time a search query is performed that includes both fields A and C. Box 606 represents a frequency with which a search query for field B included field C and vice versa. A counter is incremented each time a search query is performed that includes both fields B and C.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of retrieving information from a computer system, comprising:
   receiving an electronic search query from a user, wherein the electronic search query is received by an application and wherein the electronic search query is for data electronically stored in a memory for a database that includes a set of segments, wherein the electronic search query comprises one or more fields, wherein the set of segments are divided into a plurality of columns, wherein at least one column of the plurality of columns includes the one or more fields;
   analyzing the electronic search query to determine which of the one or more fields are required to be retrieved from the database;
   determining that a required field of the electronic search query is not located in a main memory of the computer system;
   creating an input/output request for a column containing the required field for a plurality of segments of the set of segments;
   loading into the main memory from a storage medium with a slower retrieval time than the main memory data of the column containing the required field; and
   executing the electronic search query by a processor when at least a portion of data corresponding to the one or more fields is electronically stored in the main memory.

2. The method of claim 1, wherein the at least the portion of data corresponding to the one or more fields corresponds to the data of the column.

3. The method of claim 1, wherein correlated fields are included together in a column.

4. The method of claim 3, wherein the correlated fields are frequently part of a same electronic search query.

5. The method of claim 1, wherein the input/output request for the column containing the required field for the plurality of segments of the set of segments is created while executing the electronic search query.

6. The method of claim 1, wherein creating an input/output request for a column containing the required field for a plurality of segments of the set of segments further includes determining whether a segment of the set of segments stores values of the required field that are within a range of values specified in the electronic search query.

7. The method of claim 1, wherein creating an input/output request for a column containing the required field for a plurality of segments of the set of segments further includes creating a list of memory segments and columns corresponding to the required field.

8. The method of claim 1, wherein the loaded data overwrites data that corresponds to least frequently queried fields previously stored in the main memory.

9. The method of claim 1, wherein the set of segments are sequentially stored in the storage medium with the slower retrieval time than the main memory.

10. The method of claim 1, wherein the set of segments are stored in the storage medium with the slower retrieval time than the main memory in an order based at least in part on the columns.

11. The method of claim 1, wherein the query is executed first on segments already found in the main memory.

12. The method of claim 1, wherein at least a portion of the data corresponding to the electronic search query is stored in the main memory prior to receiving the electronic search query.

13. The method of claim 1, wherein the column containing the required field is configured to store data associated with a plurality of fields.

14. The method of claim 1, wherein analyzing the query to determine which of the one or more fields are required to be retrieved from the database includes:
   determining a range of values associated with a first field stored in the main memory;
   determining that the range of values associated with the first field stored in the main memory is outside a range of values specified by the electronic search query; and
   excluding the range of values associated with the first field stored in the main memory from the input/output request.

15. The method of claim 1, wherein analyzing the electronic search query to determine which of the one or more fields are required to be retrieved from the database includes:
   determining a first range of values associated with a first field stored in the main memory;
   determining that the first range of values associated with the first field stored in the main memory is within a range of values specified by the query;
   determining a second range of values associated with a second field not stored in the main memory;
   determining that the second range of values associated with the second field stored in the main memory is within a range of values specified by the electronic search query; and
   including to the input/output request the first range of values associated with the first field and the second range of values associated with the second field.

16. A system, comprising:
a hardware processor, when operated, for causing the system to:
   receive an electronic search query from a user, wherein the electronic search query is received by an application running on the processor and wherein the electronic search query is for data electronically stored in a database that includes a set of segments, wherein the electronic search query comprises one or more fields, wherein the set of segments are divided into a plurality of columns, wherein at least one column of the plurality of columns includes the one or more fields;
   analyze the electronic search query to determine which of the one or more fields are required to be retrieved from the database;
   determine that a required field of the electronic search query is not located in a main memory of a computer system;
   create an input/output request for a column containing the required field for a plurality of segments of the set of segments;
   load into the main memory from a storage medium with a slower retrieval time than the main memory data of the column containing the required field; and
   execute the electronic search query when at least a portion of data corresponding to the one or more fields is stored in the main memory; and
a memory coupled to the processor and configured to provide the processor with instructions.

17. The system of claim 15, wherein correlated fields are included together in a column.

18. The system of claim 15, wherein the correlated fields are frequently part of a same electronic search query.

19. The system of claim 15, wherein at least a portion of the data corresponding to the electronic search query is stored in the main memory prior to receiving the electronic search query.

20. A computer program product, the computer program product being embodied on a non-transitory computer readable storage medium and comprising instructions for:
- receiving an electronic search query from a user, wherein the electronic search query is received by an application and wherein the electronic search query is for data electronically stored in a memory for a database that includes a set of segments, wherein the electronic search query comprises one or more fields, wherein the set of segments are divided into a plurality of columns, wherein at least one column of the plurality of columns includes the one or more fields;
- analyzing the electronic search query to determine which of the one or more fields are required to be retrieved from the database;
- determining that a required field of the electronic search query is not located in a main memory of a computer system;
- creating an input/output request for a column containing the required field for a plurality of segments of the set of segments;
- loading into the main memory from a storage medium with a slower retrieval time than the main memory data of the column containing the required field; and
- executing the electronic search query by a processor when at least a portion of data corresponding to the one or more fields is stored in the main memory.

* * * * *